W. J. WELLS.
Hoe.
No. 57,802.
Patented Sept. 4, 1866.
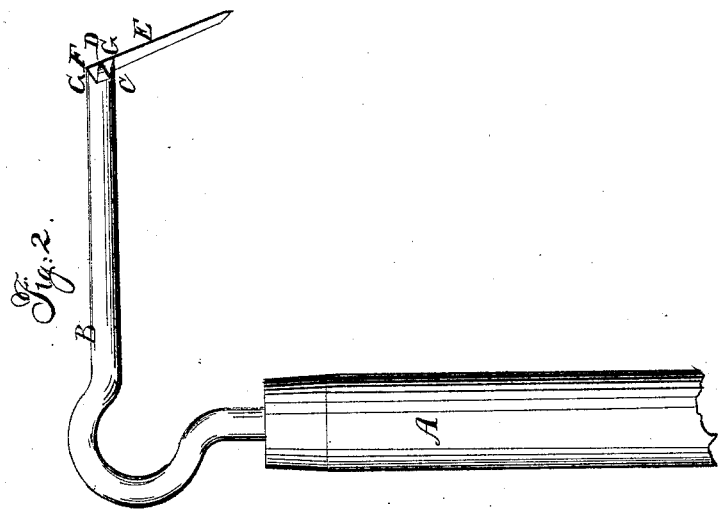
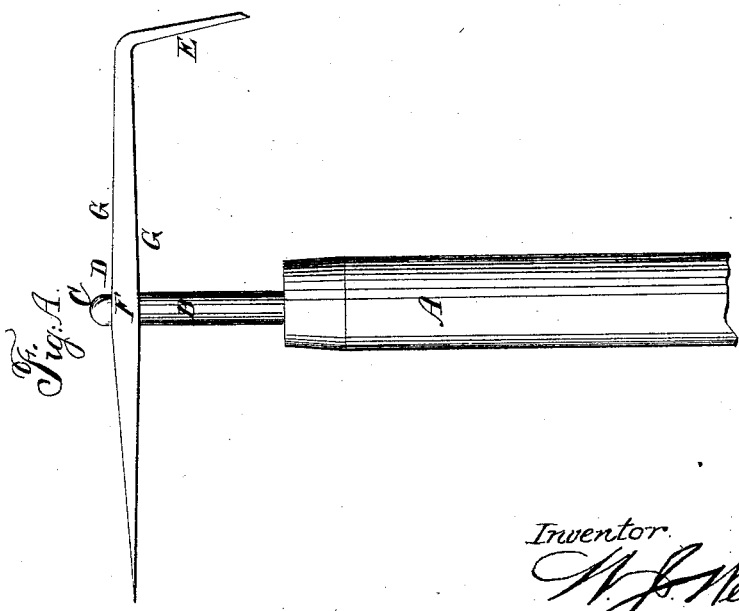

UNITED STATES PATENT OFFICE.

W. J. WELLS, OF SIDNEY, OHIO.

IMPROVEMENT IN WEEDING-HOES.

Specification forming part of Letters Patent No. 57,802, dated September 4, 1866.

*To all whom it may concern:*

Be it known that I, W. J. WELLS, of Sidney, in the county of Shelby and State of Ohio, have invented new and Improved Weeding-Hoes; and I do hereby declare that the following is a full, clear, and exact description thereof, which will enable others skilled in the art to make and use the same, reference being had to the accompanying drawings, forming part of this specification, in which—

Figure 1 is a view of the under side of the weeding arm or portion of the implement or hoe, and Fig. 2 a side view of the same.

Similar letters of reference indicate like parts.

The present invention consists in a novel construction of a weeding-hoe, whereby many important advantages are obtained, as will be obvious from the following detail description of the same.

A in the drawings represents the handle-rod or stick of the hoe, having secured in one end of it, in any proper manner, a curved arm, B, which at its outer end, C, terminates in a cross-arm, D. This arm D projects from each side of the arm B, forms right angles therewith, and is made tapering from its point of junction with the arm to each of its outer ends, at one end of which it comes to a sharp point, and at the other is bent around into a short arm, E, that comes to a sharp point at its outer end.

The under side, F, of the cross-arm B is so beveled that when drawn or pushed over the ground by the operator it will be about level with the same, whereby its tendency to enter too deep into the ground when pushed from the operator, and also its tendency to run on the surface when drawn toward the operator, are entirely obviated or overcome, the importance and advantages of which are obvious, the weeder being under perfect control by simply raising or lowering the handle A.

The two sides G G of the cross-arm B are also beveled, whereby the efficiency of the weeder in laying hold of the weeds is greatly increased, and it can be forced into the ground with much less labor to the operator—a result of the utmost importance.

The bent or side arm, E, of the cross-arm D is employed for extracting weeds that are between plants which are growing quite close together, which result is accomplished by giving to the weeder a side motion. This side arm, E, also acts as a guide to the weeder, to keep it from running too deep into the ground when pushed forward, and also aids in retaining the weeder in the ground when drawn toward the operator.

In using my improved weeding-hoe, it can be run into the ground to any desired depth, the earth falling back over the weeder, and thus holding the weeds fast by pressing them around the sharp edges of the hoe, whereby all weeds, whether above ground or not, yet having made their appearance, are taken up by the roots. The pointed ends of the hoe are used for taking up weeds, or to thin out plants which cannot be taken up by the forward or backward movement of the hoe, or to loosen the ground, if hardened, of the row or hill, the pointed ends being susceptible of being worked close to the plants.

My improved weeding-hoe is particularly advantageous for use in weeding or thinning out cotton, sugar-cane, broom-corn, corn, and all garden-vegetables.

What I claim as new, and desire to secure by Letters Patent, is—

1. The cross-arm D, having its bottom F and sides G beveled and pointed at its ends, substantially as and for the purpose described.

2. In combination with the above, the side arm E, for the purpose specified.

W. J. WELLS.

Witnesses:
HENRY W. NEAL,
A. W. LIVINGSTON.